(12) United States Patent
Chen

(10) Patent No.: US 6,450,425 B1
(45) Date of Patent: Sep. 17, 2002

(54) CONNECTOR STRUCTURE OF WALL HANGING TYPE SHOWER HEAD

(76) Inventor: Te-Sen Chen, No. 31, Alley 52, Lane 81, Shanjung St., Changhua City, 500 (TW)

( * ) Notice: Subject to any disclaimer, the term of this patent is extended or adjusted under 35 U.S.C. 154(b) by 0 days.

(21) Appl. No.: 09/976,046

(22) Filed: Oct. 15, 2001

(51) Int. Cl.[7] ............................................... B05B 15/08
(52) U.S. Cl. ........................................ 239/587.4; 4/615
(58) Field of Search .................. 4/567, 615; 239/587.3, 239/587.4; 285/271

(56) References Cited

U.S. PATENT DOCUMENTS

| | | | | |
|---|---|---|---|---|
| 2,990,122 A | * | 6/1961 | Blumberg et al. ... | 239/587.4 X |
| 3,224,793 A | * | 12/1965 | Benjamin ............ | 239/587.4 X |
| 3,887,136 A | * | 6/1975 | Anderson ............ | 239/587.4 X |
| 6,276,614 B1 | * | 8/2001 | Huang ................. | 4/615 X |

* cited by examiner

Primary Examiner—Robert M. Fetsuga
(74) Attorney, Agent, or Firm—Rosenberg, Klein & Lee

(57) ABSTRACT

The present invention is related to a connector structure of a wall hanging type shower head, including a body, a connector, and a positioning nut positioning the connector on the body. A positioning ring is mounted between the rotation portion of the connector and the positioning nut. The positioning ring has an inner periphery provided with a limit edge rested on the rotation portion of the connector, and has an outer periphery formed with a positioning shoulder rested on the positioning nut. The positioning shoulder may be locked with the positioning nut to prevent the positioning nut from contacting the rotation portion of the connector directly, thereby preventing the rotation portion of the connector from being worn out, so as to increase the lifetime of the rotation portion of the connector.

3 Claims, 5 Drawing Sheets

CONNECTOR STRUCTURE OF WALL HANGING TYPE SHOWER HEAD

BACKGROUND OF THE INVENTION

1. Field of the Invention

The present invention relates to a connector structure of a wall hanging type shower head, and more particularly to a connector structure of a wall hanging type shower head, wherein the lifetime of the rotation portion of the connector may be increased.

2. Description of the Related Art

A conventional connector structure of a wall hanging type shower head in accordance with the prior art shown in FIGS. 4 and 5 comprises a body 10 having a threaded end 11 for mounting a connector 20, and a positioning nut 30 screwed on the threaded end 11. The body 10 has a seat portion 12 for mounting a shower head 90. The body 10 has a coupler 13 joined with a water outlet pipe 91 of the shower head 90. The connector 20 has a first end formed with a rotation portion 21 and a second end formed with a pipe connection portion 22 connected with a water inlet pipe 92. A watertight washer 93 is mounted between the water inlet pipe 92 and the pipe connection portion 22 of the connector 20. A watertight washer 94 is mounted between the rotation portion 21 of the connector 20 and the body 10. The positioning nut 30 has a positioning edge 31 for locking and positioning the rotation portion 21 of the connector 20.

However, the conventional connector structure of a wall hanging type shower head has the following disadvantages.
1. The rotation portion 21 of the connector 20 directly contacts the positioning edge 31 of the positioning nut 30, so that a large friction is created between the rotation portion 21 of the connector 20 and the positioning edge 31 of the positioning nut 30. Thus, the surfaces of the rotation portion 21 of the connector 20 and the positioning edge 31 of the positioning nut 30 are easily worn out during long-term utilization, so that tightness between the rotation portion 21 of the connector 20 and the positioning edge 31 of the positioning nut 30 is not large enough, thereby affecting the close fit between the rotation portion 21 of the connector 20 and the watertight washer 94, so that water easily leaks out. In addition, the rotation portion 21 of the connector 20 and the positioning edge 31 of the positioning nut 30 need to be replaced, thereby increasing cost of maintenance.
2. The body 10, the rotation portion 21 of the connector 20, and the positioning nut 30 are positioned in a close fit manner without clearance, so that rotation of the rotation portion 21 of the connector 20 is not convenient.

SUMMARY OF THE INVENTION

The present invention has arisen to mitigate and/or obviate the disadvantage of the conventional connector structure of a wall hanging type shower head.

The primary objective of the present invention is to provide a connector structure of a wall hanging type shower head, including a body, a connector, and a positioning nut positioning the connector on the body. A watertight washer is mounted between the rotation portion of the connector and the body, and a positioning ring is mounted between the rotation portion of the connector and the positioning nut. The positioning ring has an inner periphery provided with an arcuate limit edge rested on the rotation portion of the connector, and has an outer periphery formed with a positioning shoulder rested on the positioning edge of the positioning nut. The positioning ring is formed with an enlarged edge, thereby reducing the area of friction between the positioning ring and the rotation portion of the connector. The positioning shoulder of the positioning ring may be locked with the positioning nut to prevent the positioning nut from directly contacting the rotation portion of the connector, thereby preventing the rotation portion of the connector from being worn out, so as to increase the lifetime of the rotation portion of the connector.

In accordance with a preferred embodiment of the present invention, there is provided a connector structure of a wall hanging type shower head, comprising a body having a threaded end for mounting a connector, a positioning nut screwed on the threaded end, the body having a seat portion for mounting a shower head, the body having a coupler joined with a water outlet pipe of the shower head, the connector having a first end formed with a rotation portion and a second end formed with a pipe connection portion, the positioning nut having a positioning edge for locking and positioning the rotation portion of the connector; wherein, a ring-shaped watertight washer is mounted between the rotation portion of the connector and the body; and an elastic positioning ring that may be expanded and contracted elastically is mounted between the rotation portion of the connector and the positioning edge of the positioning nut, the positioning ring is formed with a retraction slit, the positioning ring is provided with an arcuate limit edge opposite to the rotation portion of the connector, and the positioning ring has an outer periphery formed with a positioning shoulder that is opposite to the positioning edge of the positioning nut.

Further benefits and advantages of the present invention will become apparent after a careful reading of the detailed description with appropriate reference to the accompanying drawings.

DETAILED DESCRIPTION OF THE INVENTION

Figure 1:
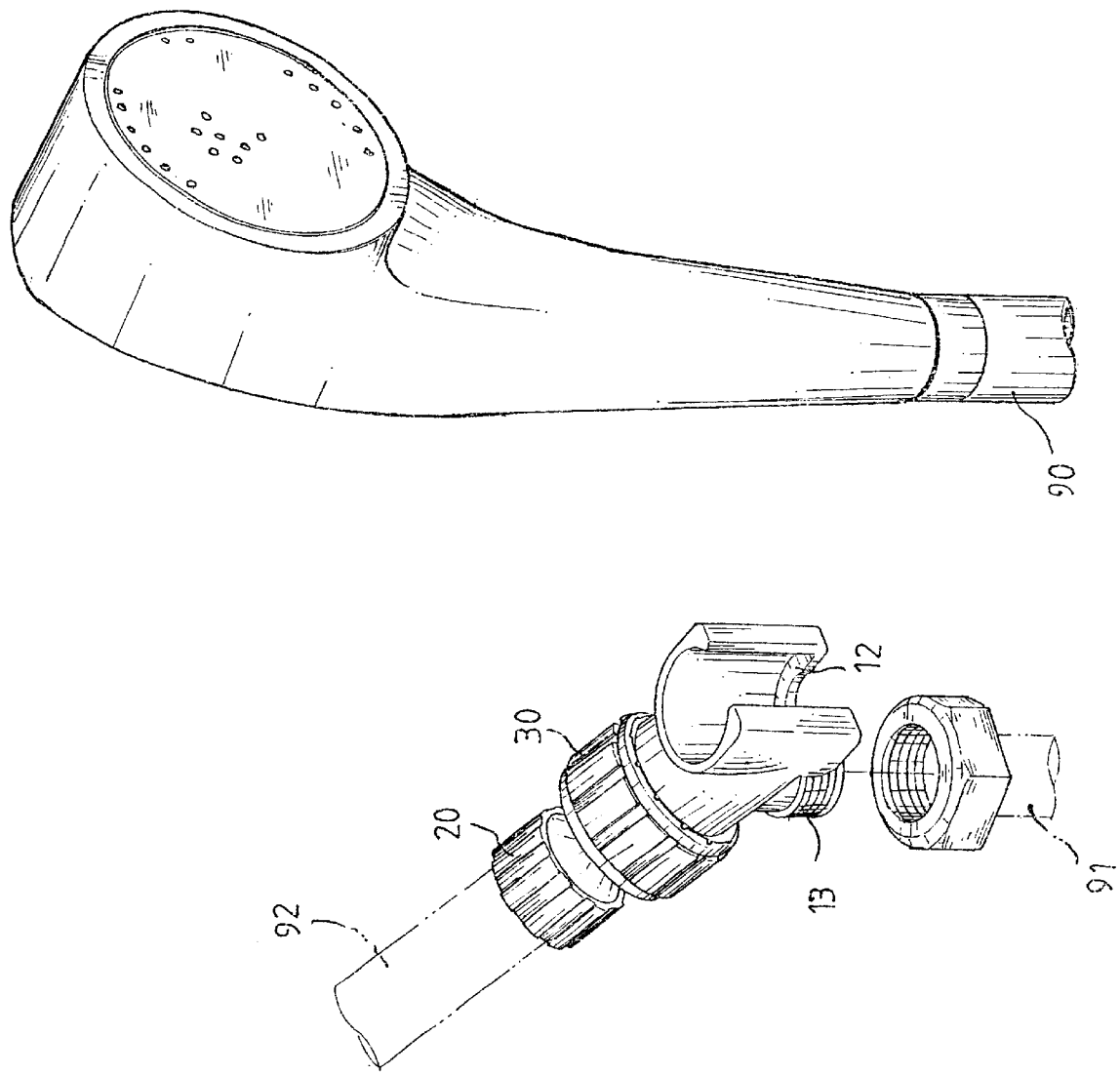
FIG. 1 is a partially exploded perspective view of a connector structure of a wall hanging type shower head in accordance with a preferred embodiment of the present invention.
Figure 2:
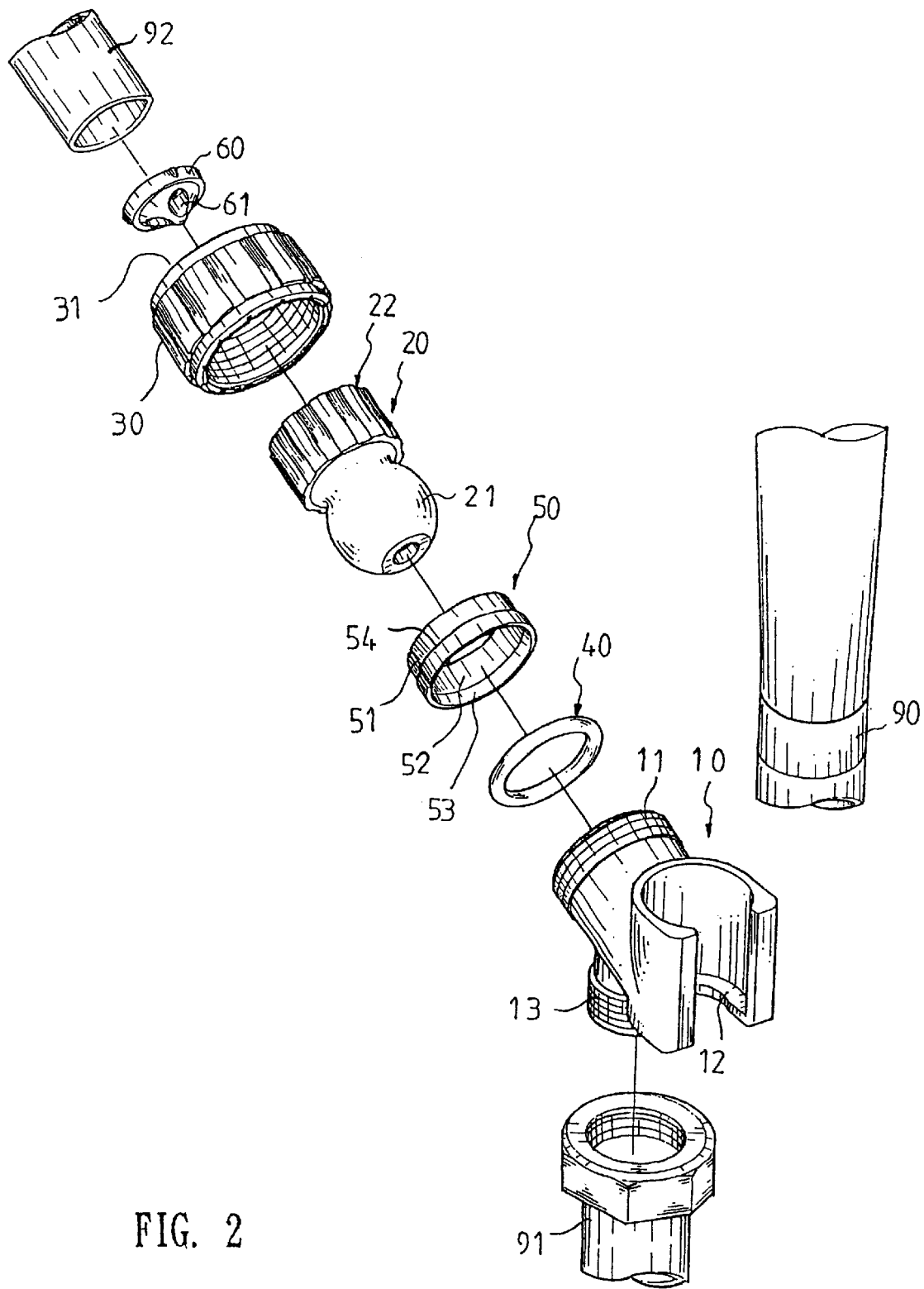
FIG. 2 is an exploded perspective view of a connector structure of a wall hanging type shower head in accordance with a preferred embodiment of the present invention.
Figure 3:
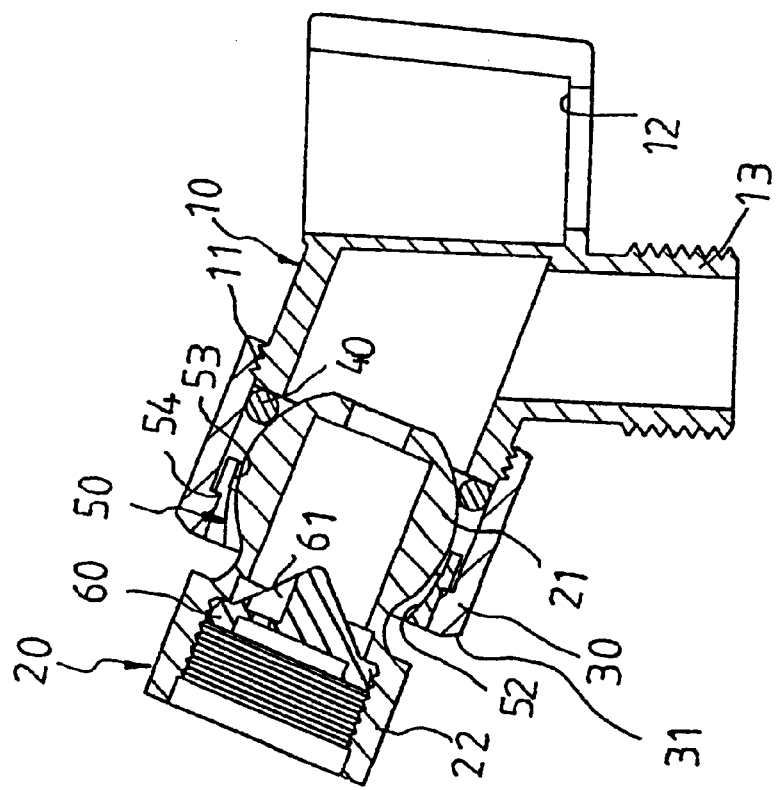
FIG. 3 is a cross-sectional assembly view of the connector structure of a wall hanging type shower head as shown in FIG. 2.
Figure 4:
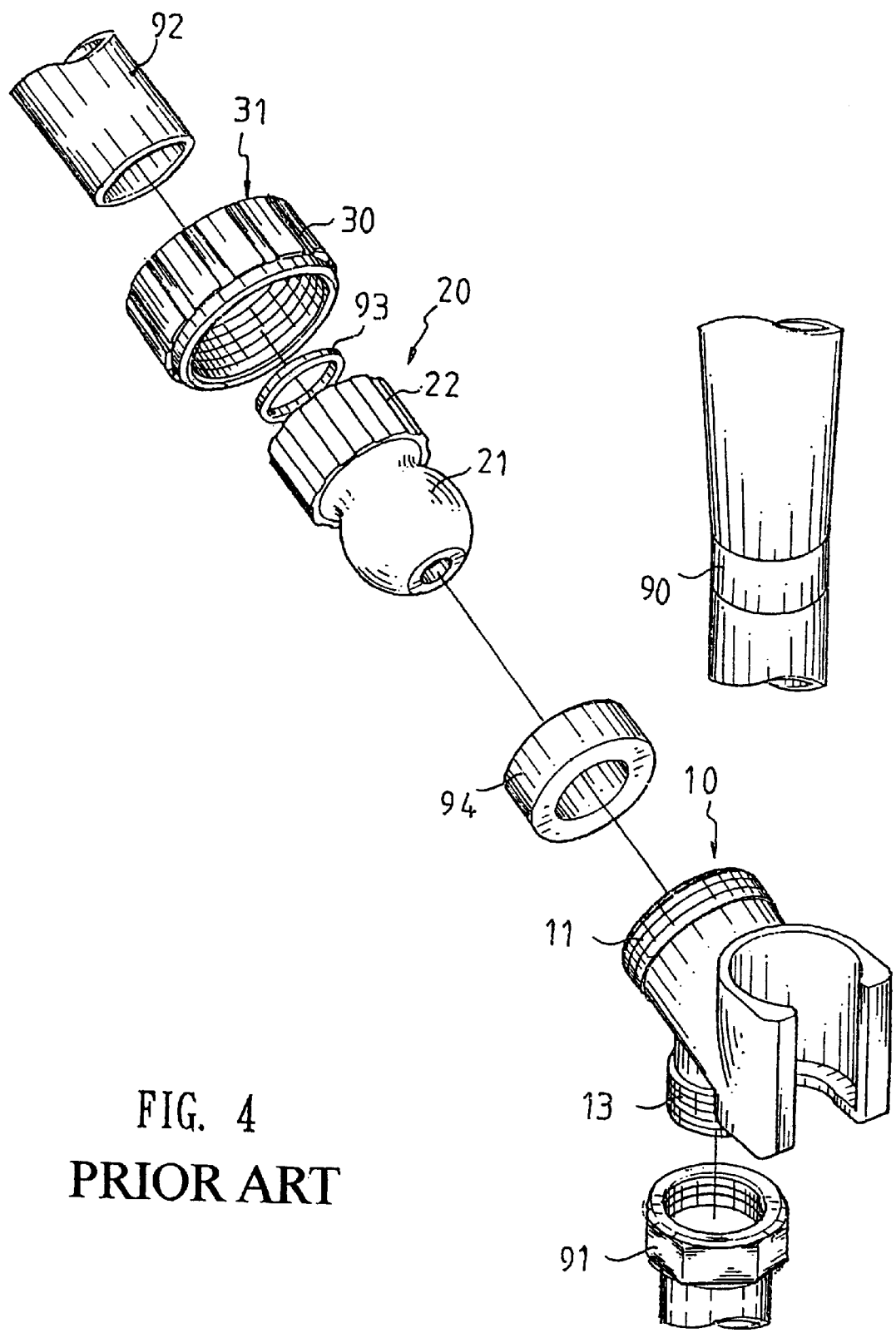
FIG. 4 is an exploded perspective view of a conventional connector structure of a wall hanging type shower head in accordance with the prior art.
Figure 5:
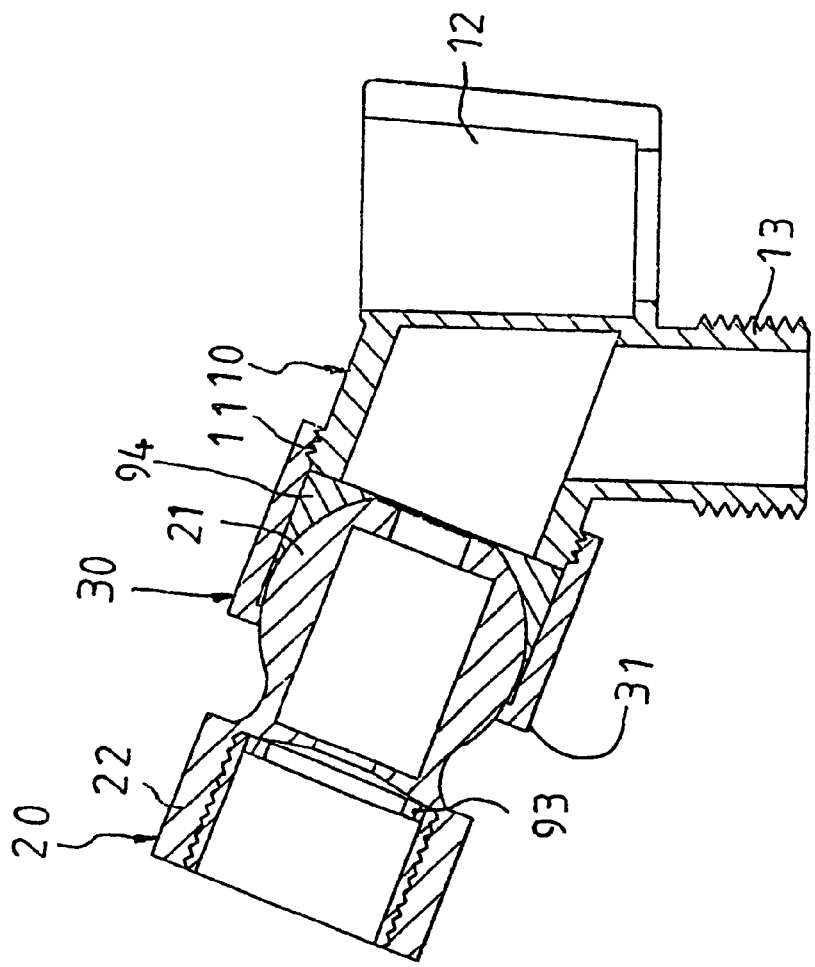
FIG. 5 is a cross-sectional assembly view of the conventional connector structure of a wall hanging type shower head as shown in FIG. 4.

Referring to the drawings and initially to FIGS. 1–3, a connector structure of a wall hanging type shower head in accordance with a preferred embodiment of the present invention comprises a body 10 having a threaded end 11 for mounting a connector 20, and a positioning nut 30 screwed on the threaded end 11. The body 10 has a seat portion 12 for mounting a shower head 90. The body 10 has a coupler 13 joined with a water outlet pipe 91 of the shower head 90. The connector 20 has a first end formed with a rotation portion 21 and a second end formed with a pipe connection portion 22. The positioning nut 30 has a positioning edge 31 for locking and positioning the rotation portion 21 of the connector 20.

The feature of the present invention is emphasized in the mating structure between the rotation portion 21 of the connector 20, the body 10, and the positioning edge 31 of the positioning nut 30.

A ring-shaped watertight washer 40 is mounted between the rotation portion 21 of the connector 20 and the body 10.

An elastic positioning ring 50 that may be expanded and contracted elastically is mounted between the rotation portion 21 of the connector 20 and the positioning edge 31 of the positioning nut 30. The positioning ring 50 is transversely formed with a retraction slit 51, such that the positioning ring 50 may be expanded and contracted elastically The positioning ring 50 may be provided with an arcuate limit edge 52 opposite to the rotation portion 21 of the connector 20, thereby exactly protecting and holding the rotation portion 21 of the connector 20. The limit edge 52 of the positioning ring 50 has a distal end formed with an enlarged edge 53 that may reduce the contact area of the positioning ring 50 with the rotation portion 21 of the connector 20, so that the limit edge 52 of the positioning ring 50 may have a proper area to contact the rotation portion 21 of the connector 20. The positioning ring 50 has an outer periphery formed with a positioning shoulder 54 opposite to the positioning edge 31 of the positioning nut 30, so that the positioning ring 50 may be exactly positioned by the positioning edge 31 of the positioning nut 30. When the positioning nut 30 is screwed on the threaded end 11 of the body 10, the positioning ring 50 may push the rotation portion 21 of the connector 20 to move toward the body 10.

A watertight pressurizing pad 60 is mounted in the pipe connection portion 22 of the connector 20, and is rested on a water inlet pipe 92. The watertight pressurizing pad 60 is a hollow conic body having a surface formed with multiple contraction holes 61. Thus, when the water is supplied from the water inlet pipe 92, the water may be collected and pressurized to flow through the multiple contraction holes 61 to form multiple water beams in a slightly rotational manner, and the multiple water beams may flow through the water outlet pipe 91 to enter the shower head 90 for use.

In conclusion, the connector structure of a wall hanging type shower head in accordance with the present invention has the following advantages.

1. The positioning edge 31 of the positioning nut 30 is locked with the positioning shoulder 54 of the positioning ring 50, and does not contact the rotation portion 21 of the connector 20 directly, while the limit edge 52 of the positioning ring 50 may have a proper area to contact the rotation portion 21 of the connector 20, so that the friction produced between the limit edge 52 of the positioning ring 50 and the rotation portion 21 of the connector 20 may be distributed evenly and efficiently, thereby preventing the rotation portion 21 of the connector 20 from being worn out due to friction, so as to protect the rotation portion 21 of the connector 20 and increase the lifetime of the rotation portion 21 of the connector 20. The positioning edge 31 of the positioning nut 30 does not produce friction during rotation of the rotation portion 21 of the connector 20, thereby preventing wearing or breaking the positioning edge 31 of the positioning nut 30.

2. The elastic positioning ring 50 that may be expanded and contracted elastically by the retraction slit 51. Thus, when the body 10 is slightly loosened from the positioning nut 30, the elastic positioning ring 50 may be contracted slightly, to push the rotation portion 21 of the connector 20 to move toward the watertight washer 40 in the body 10. When the positioning nut 30 is tightly screwed on the body 10, the elastic positioning ring 50 may be expanded, so as to decrease the tightness of the entire assembly structure. Thus, regardless of the entire structure, the rotation portion 21 of the connector 20 may maintain a determined close extent with the watertight washer 40, thereby achieving an optimal tensile state, so that the rotation portion 21 of the connector 20 may be rotated stably. Accordingly, the rotation portion 21 of the connector 20, the positioning nut 30 and the body 10 may have a determined space of elastic variation by provision of the elastic positioning ring 50.

3. The positioning ring 50 may be expanded by pulling the retraction slit 51 to pass the rotation portion 21 of the connector 20 easily, and to locate between the rotation portion 21 and the pipe connection portion 22 of the connector 20, thereby facilitating assembling the entire structure.

While the preferred embodiment of the present invention has been shown and described, it will be apparent to those skilled in the art that various modifications may be made in the embodiment without departing from the spirit of the present invention. Such modifications are all within the scope of the present invention.

What is claimed is:

1. A connector structure of a wall hanging type shower head, comprising a body having a threaded end for mounting a connector, a positioning nut screwed on the threaded end, the body having a seat portion for mounting a shower head, the body having a coupler joined with a water outlet pipe of the shower head, the connector having a first end formed with a rotation portion and a second end formed with a pipe connection portion, the positioning nut having a positioning edge for locking and positioning the rotation portion of the connector; wherein, a ring-shaped watertight washer is mounted between the rotation portion of the connector and the body; and an elastic positioning ring that may be expanded and contracted elastically is mounted between the rotation portion of the connector and the positioning edge of the positioning nut, the positioning ring is formed with a retraction slit, the positioning ring is provided with an arcuate limit edge opposite to the rotation portion of the connector, and the positioning ring has an outer periphery formed with a positioning shoulder that is opposite to the positioning edge of the positioning nut.

2. The connector structure of a wall hanging type shower head in accordance with claim 1, wherein the limit edge of the positioning ring has a distal end formed with an enlarged edge.

3. The connector structure of a wall hanging type shower head in accordance with claim 1, further comprising a watertight pressurizing pad mounted in the pipe connection portion of the connector, and rested on a water inlet pipe, wherein, the watertight pressurizing pad is a hollow conic body having a surface formed with multiple contraction holes, so that when water is supplied from the water inlet pipe, the water may be collected and pressurized to flow through the multiple contraction holes to form multiple water beams in a slightly rotational manner, and the multiple water beams may flow through the water outlet pipe to enter the shower head for use.

\* \* \* \* \*